Aug. 25, 1970  H. L. BARNEBEY  3,525,674
SUBMERGED COMBUSTION CARBONIZATION
Filed May 23, 1966  3 Sheets-Sheet 1
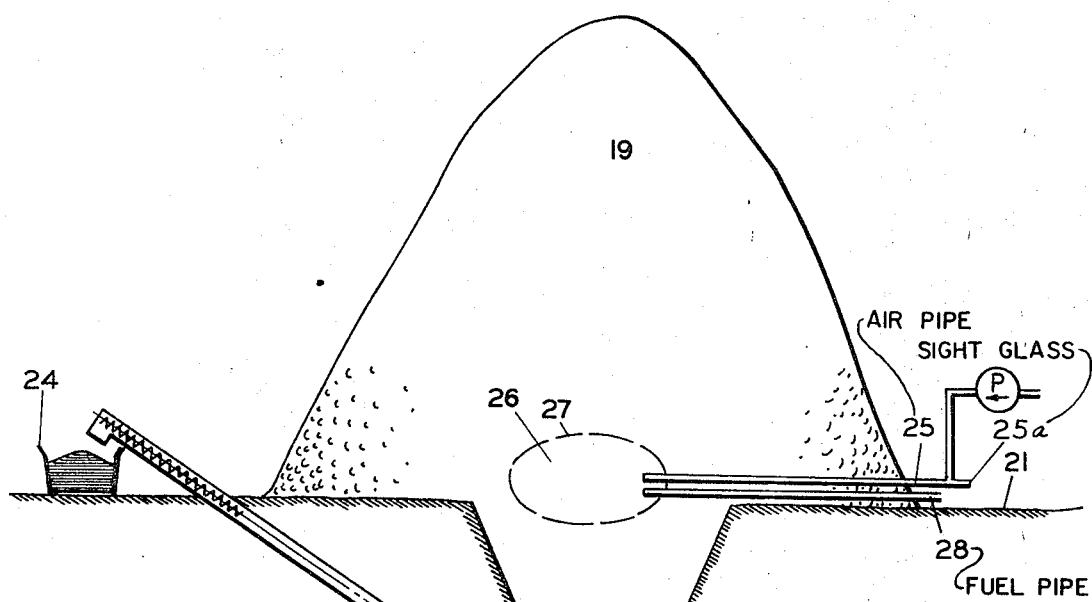
FIG. 2
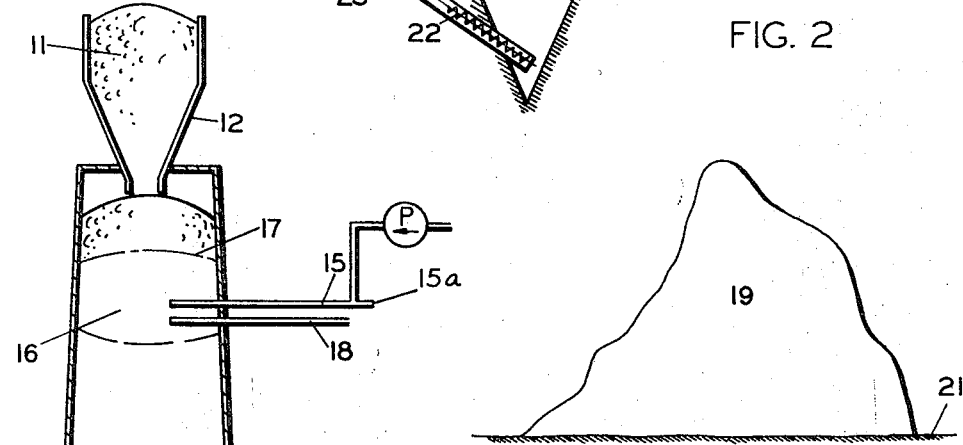
FIG. 1
FIG. 5
INVENTOR.
HERBERT L. BARNEBEY
BY 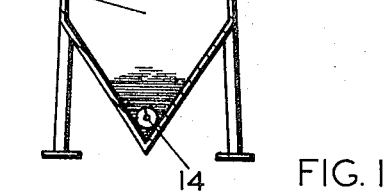
ATTORNEY

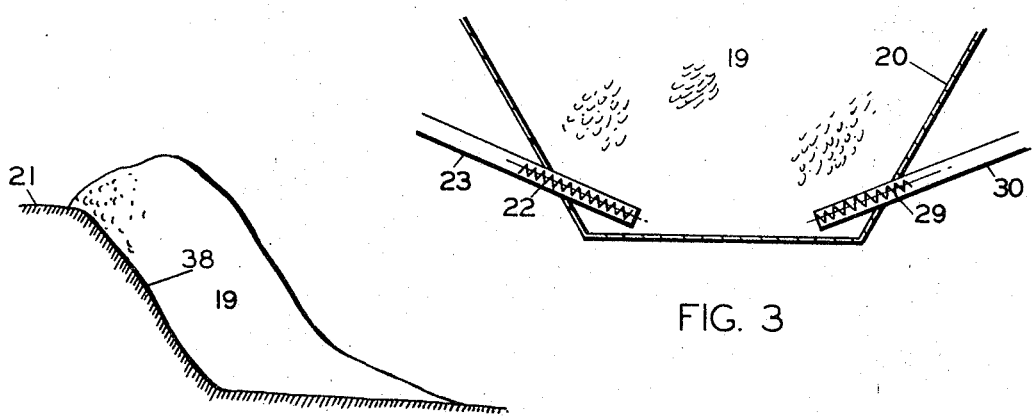
FIG. 3
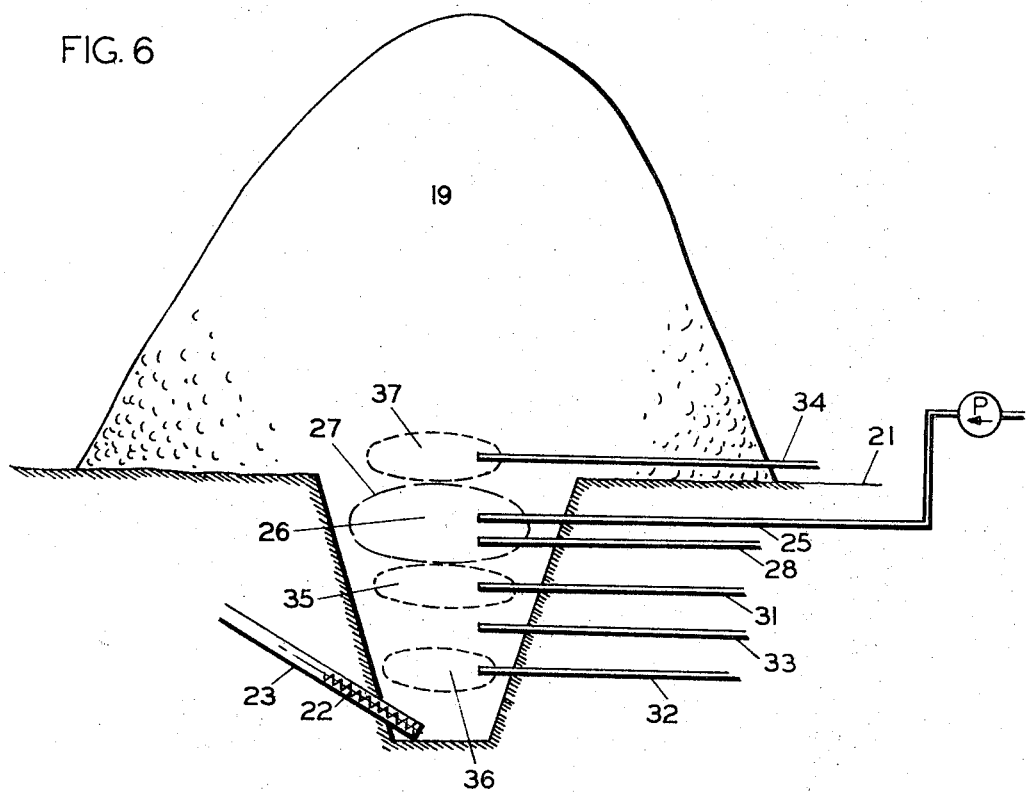
FIG. 6
FIG. 4

Aug. 25, 1970     H. L. BARNEBEY     3,525,674

SUBMERGED COMBUSTION CARBONIZATION

Filed May 23, 1966     3 Sheets-Sheet 3

INVENTOR.
HERBERT L. BARNEBEY
BY Cox and Sheridan
ATTORNEY

United States Patent Office 3,525,674
Patented Aug. 25, 1970

3,525,674
SUBMERGED COMBUSTION CARBONIZATION
Herbert L. Barnebey, Columbus, Ohio, assignor to Barnebey-Cheney Co., Columbus, Ohio, a corporation of Ohio
Filed May 23, 1966, Ser. No. 552,151
Int. Cl. C10b 49/02
U.S. Cl. 201—27
8 Claims

ABSTRACT OF THE DISCLOSURE

Carbonization is effected in a pile of carbonizable particles while, preferably, the particles move continuously through a relatively stationary combustion zone. The combustible gases evolved as a result of carbonization are not removed from the pile but, rather, are burned in the combustion zone, as they evolve, by the introduction of air therein. Stabilization of the combustion zone is maintained, when heating is necessary, by introducing air and combustible fluids into the combustion zone from outside the pile; and, when cooling is necessary, by introducing water into said zone. The process permits of a single step production of activated carbon.

---

This invention relates to a method of and apparatus for carbonization and to the production of charcoal and coke.

Carbon in the form of charcoal or coke can be derived from any one of a wide variety of organic materials but, in the past, has usually been derived from wood, bone, or nut shells in the case of charcoal and from bituminous coal in the case of coke. A process which illustrates the principles of carbonization is the destructive distillation of wood wherein wood is heated in a container in the absence of air. In addition to its chemically combined constituents, wood contains water in the form of moisture and also contains other volatile matter physically associated therewith. Such water and physically associated volatile matter are driven off first as the temperature increases. As the wood passes through its range of decomposition temperatures; e.g. about 200°–500° C.; the chemical bonds between the carbon atoms, the bonds between carbon and oxygen atoms, and other bonds rupture; resulting in the evolving of water, carbon dioxide, hydrocarbons, acids, aldehydes, ketones, etc. formed during the decomposition reaction. When the process has been completed charcoal remains in the container.

The overall decomposition reaction, exclusive of heat required for drying the wood, is an exothermic reaction. If, during carbonization, the heat of decomposition is not dissipated, but rather is effectively used to maintain a decomposition temperature, the carbonization reaction, once initiated, will continue without any outside source of heat. Further, a substantial proportion of the volatile matter being driven off is combustible and combustion of the volatiles has, in the past, been used to supply heat to the container.

It has been the practice for many years to initiate carbonization in wood, for example, by first igniting a portion of the wood and then shutting off or greatly restricting the supply of air. In this manner the carbonization boundary moves progressively from wood in the hot zone to wood in the cooler zones, the temperature of a selected piece of wood rising progressively higher as the carbonization boundary approaches it until the piece has itself reached the decomposition temperature. Thus, centuries ago it was known that charcoal could be made by igniting a pile of wood and then covering the pile with dirt or sod. The need for controlling the diffusion of air into the wood pile and the desire to keep as much dirt as possible out of the charcoal caused early charcoal makers to put the wood into a hole in the ground or to adopt unique ways to stack the wood.

The carbonization process has, of course, been adapted to continuous operation. One well known continuous method comprises the steps of drying wood and then passing it through a tunnel kiln in cars. A car, containing dry wood, is pushed into one end of the kiln while a car containing charcoal is removed from the other end of the kiln. Carbonization goes on in the kiln in a restricted concentration of air as the cars pass through the kiln. Other well known types of continuous carbonization processes involve moving dry carbonizable material horizontally through a chamber with screw conveyors or vertically through a chamber by gravity flow, heat for initiating carbonization being supplied through the container wall.

Thus, major problems in continuous processes have involved the necessity of controlling the size of the carbonizable materials, of predrying the materials, the expense of initial installations, and the considerable amount of maintainance required by such installations because of the intense heat produced and because of the corrosive effects of the volatiles given off.

In U.S. Pat. No. 3,177,128 issued Apr. 6, 1965, B. V. Vartanian describes a continuous process of carbonization for the production of charcoal and the recovery of volatiles in which an attempt is made to solve some of the foregoing problems by flowing particles of a carbonizable material downwardly through a "pre-drying zone"; then through a "carbonization zone" wherein the temperature of the material varies from about 200° C. to about 425° C.; and then through a "high temperature zone" at a temperature of at least 600° C. Vartanian recognizes the dual advantage of controlling the temperature of the carbonization process and the use of additional heat, over and above the exothermic heat of reaction, in such control. Such extra heat is added by recycling hot inert gases (after separating out the combustible volatiles) to his "high temperature zone" and, if necessary, by the supplying of a restricted quantity of air to his "high temperature zone." It will be seen that my invention, although dealing with "extra heat" and with the objective of temperature control, attains this and other important objectives in a much simpler and more advantageous manner.

A problem which has caused charcoal manufacturers considerable concern is the production of a good quality charcoal, or the improvement in charcoal quality, without exceeding economic reason. Probably the greatest single problem in this area is that of preparing a charcoal in an economical manner and yet of a quality suitable for subsequent activation. An important contribution to processes for the preparation of activated charcoal would be the substantially complete, and economic, removal of volatiles in a single step carbonization. This has not yet been accompilshed, to the best of my knowledge, by the foregoing types of processes. In this connection the term "carbonization," as used herein, includes the formation of activated carbon from an already manufactured charcoal and includes the reactivation of spent activated charcoal.

It is believed that the prior processes of the art have been limited in their capacity to form a charcoal suitable for subsequent activation because of a lack of control of the timely evolution of, and handling of, the volatile matter as the latter forms. In it is believed, for example, that uncontrolled cracking of wood-containing molecules can result in the formation of tars which block pores in the wood-charcoal structure. Further, failure to remove volatiles as rapidly as they are formed can cause their interaction and a redeposit of the reaction products of evolved material on potentially active surfaces.

Another problem arises in connection with activation by the known two-step methods because charcoal activation is frequently carried out at a place which is some distance from the place of the original partial carbonization making the cost of the added shipping weight of the subsequently removed volatile matter a considerable item of expense.

Carbonization has been carried out using carbonizable materials impregnated with chemicals such as zinc chloride and phosphoric acid. These processes are quite expensive because of the extremely corrosive nature of the chemicals. An economical method of utilizing such impregnating chemicals would be very desirable because their use results in a higher yield of charcoal, an activated charcoal, and a better decolorizing charcoal. As will appear hereinafter such impregnated carbonizable materials can be used with advantage in the method of my invention.

OBJECTS

It is therefore an object of this invention is to provide a simple, yet improved, method of making charcoal or coke from carbonizable materials.

It is a further object to provide a method for carbonizing carbonizable materials to make a charcoal which is more suitable for activation than has been the case heretofore.

It s a further object to reduce the expense of carbonizing apparatus for use in continuous processes.

It is a further object to use both the heat of decomposition of carbonizable materials and the heat of combustion of evolved volatiles for a more efficient carbonization process.

It is a further object to provide a carbonization method which is substantially insensitive to process variables and wherein deviations from the prescribed operation, if they occur, may be quickly and easily corrected.

It is a further object to provide a method of carbonization which permits of carbonization at high temperatures heretofore considered unattainable and, in particular, at temperatures which quickly effect the destruction of the usual materials of construction.

It is a further object to provide a method for the carbonization of wet carbonizable material which method does not require a predrying step.

It is a further object to provide a method of carbonization which does not require that the carbonizable particles be of any particular size nor require that all the particles be of a uniform size.

It is a further object to provide a method of carbonization which permits of the use of chemically impregnated carbonizable materials in the absence of the severe corrosive effects which have been characteristic of their use in the past.

It is a further object to provide a method of carbonizing a carbonizable material which avoids the tendency of volatile matter to crack or to deposit tarry residues on potentially active carbon surfaces.

It is a further object to provide a new and simple method for the direct production of activated charcoal from carbonizable material.

The foregoing and related objects can be attained in an apparatus for carrying out carbonization and gas combustion in a zone within a pile of carbonizable material wherein the apparatus comprises means positioned in said zone to bring air into contact with a substantial proportion of, and preferably all, the combustible gases therein; said gases having been evolved during said carbonization, having been introduced therein from outside the pile, or both. In a preferred embodiment of my apparatus I also provide means for effecting relative movement between said material and the zone in which combustion of said combustible gases takes place. The term "relative movement," as used herein, refers to the movement of material through a relatively stationary combustion zone, refers to the movement of the combustion zone through relatively stationary material, refers to the movement of both the material and the combustion zone countercurrently to each other, or the like.

A particular apparatus for attaining the foregoing and related objects in the carbonization of flowable particulate carbonizable material comprises (1) a confined or unconfined pile of said material; (2) means positioned in the interior of said pile to effect the combustion, in a gas combustion zone within said pile, of at least a substantial proportion of the combustible volatile products of carbonization; and (3) means for effecting the movement of a substantial proportion of said carbonizable material through said gas combustion zone. Although the material may be moved laterally or upwardly through the gas combustion zone I prefer a downward movement of the material, which downward movement can be suitably effected by the removal of charcoal from the bottom of the pile.

The foregoing and related objects are attained in a method of carbonizing particles of a carbonizable material, the method comprising the steps of (1) maintaining a confined or unconfined pile of said particles; (2) effecting carbonization in a zone inside the pile; (3) providing for the presence of combustible gases in said zone either as volatile matter of carbonization, or as fuel gases introduced into the pile from outside the pile, or both; and (4) effecting combustion of at least a substantial proportion of said combustible gases within said zone. In a preferred embodiment of the method of my invention I also effect relative movement between said particles and the zone in which combustion of the volatiles (or combustion of added fuel) is taking place. It is a feature of my invention that flowable carbonizable particles can be moved through a zone wherein volatile matter is undergoing combustion at a rate such that the rate of movement of the particles balances the rate of movement of the carbonization boundary thus holding the position of the combustion zone relatively stationary.

The term "flowable" as used herein means that the carbonizable material is supplied in a particulate form such that it will flow downwardly readily in response to the pull of gravity, will flow upwardly as particulate matter flows in the standard bottom feed stoker, will flow laterally in a screw conveyor, or the like. Nut shells, bones, sawdust, wood shavings, and lumps of coal are specific examples of such flowable particulate matter. A feature of the invention, however, is the fact that I can use a wide assortment of particle sizes. For example, wood waste containing slabs and irregular pieces of wood can be mixed with sawdust, nut shells, etc. In my process large pieces of wood tend to break as charcoal is formed or will break up in a screw conveyor removing the charcoal product. It is, of course, much easier to break up pieces of charcoal than it is to break or chip wood. As a further example of the versatility of the method I can supply the carbonizable material in bags without removing the material from the bag. In the latter case the bag itself carbonizes and becomes a "flowable carbonizable particle."

Other objects and features of the invention will become apparent from a reading of the specification and of the claims appended hereto and from a consideration of the accompanying drawings.

In the drawings:

FIG. 1 is a side elevation showing, in cross section, apparatus suitable for carrying out the present invention;

FIG. 2 is an elevation view, in cross section, illustrating apparatus for and a method of carbonization which constitutes a preferred embodiment of the invention;

FIG. 3 is a partial elevation view showing additional details of apparatus suitable for use in the carrying out of the invention;

FIG. 4 is an elevation view, in cross section, similar to FIG. 2 and illustrating the carrying out of a method alternative to that illustrated by FIG. 2;

FIG. 5 illustrates an alternative way of piling the carbonizable material;

FIG. 6 illustrates still another alternative way of piling the carbonizable material;

Figure 8:
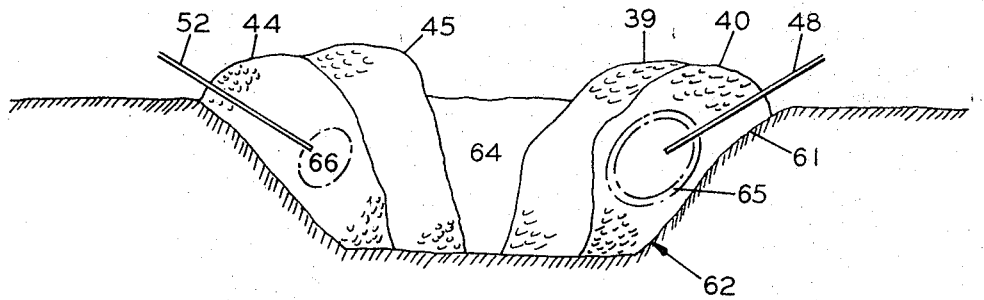
FIG. 8 is a sectional view taken along the line 8—8 of FIG. 7.

With more detailed reference to the drawings, FIG. 1 shows a cylindrical container 10 into which carbonizable material 11 may be fed via a hopper 12 and from which charcoal 13 may be removed via a screw conveyor 14 positioned near the bottom of the cylinder 10. A pipe 15, equipped with a pump P, provides air to the interior of the bed of carbonizable material and serves to effect the combustion of volatiles in a combustion (or carbonization) zone 16 bounded on its uppermost edge by a carbonization boundary 17 which tends to advance upwardly. The pipe 15 can also admit water to the combustion zone 16, if desired. A second pipe 18, positioned near pipe 15, serves to admit fuel for combustion or to admit water, if desired. A sight glass 15a is positioned on pipe 15 to permit observation of the carbonization zone 16.

It will be understood by those skilled in the art that the combustion zone 16 and the carbonization boundary 17 will not generally assume any easily definable shape nor will their shape be constant. Rather the air entering the combustion zone will diffuse outwardly from the air pipe outlet to "find" combustible gases and thus define a combustion zone.

FIG. 2 illustrates a method of and apparatus for carbonization and is a preferred embodiment of the invention. An unconfined pile of pecan shells 19, or similar particulate carbonizable material, is placed in and over a hole 20 in the ground 21. A screw conveyor 22 is casing or trough 23 serves to remove charcoal from the bottom of the pile 19 and deposit it in the receptacle 24. A pipe 25, equipped with a pump P, serves to admit air to the interior of the pile of shells and to effect combustion of volatiles being evolved during carbonization, combustion taking place in the combustion zone 26. During periods of temperature correction the pipe 25 can serve to admit water into the hot zone 26. The upper edge 27 of the combustion zone 26 is the carbonization boundary which tends to advance outwardly. A second pipe 28 serves to admit fuel to be burned in the interior of the pile or to admit water, if required. A sight glass 25a is positioned on pipe 25 to permit observation of the carbonization zone 26.

FIG. 3 illustrates an alternative method of removing charcoal from the bottom of the pile 19 wherein two screw conveyors are used. In addition to the screw conveyor 22 in the shaft 23, already described, there is a second screw conveyor 29 positioned in the shaft or trough 30.

FIG. 4 illustrates a method and apparatus similar to that of FIG. 2. In addition to the structures shown in FIG. 2 there are shown pipes 31, 32 which serve to introduce restricted quantities of air relatively lower in the pile than air-supply pipe 25. Similarly, there is shown a pipe 34 which serves to introduce air relatively higher in the pile 19. A pipe 33 serves to provide water or steam near the bottom of the carbonization zone. The use of the three air pipes 25, 31, and 34 permits an enlargement of the combustion zone. Thus, the air entering the zone via pipe 25 will be somewhat limited as compared to operation in accordance with the apparatus of FIG. 2. Thus some volatile (or fluid fuel from outside the pile) will be burned in combustion zone 26, some in combustion zone 37, and some in combustion zone 35. Although the zones 26, 35, and 37 are shown as separate zones it will be understood that no sharp line of demarcation exists and that, in effect, the three zones become one large zone. This use of multiple air inlets provides an effective means for controlling the temperature gradient in the pile.

With further reference to FIG. 4, pipe 32 can serve to admit air quite low in the pile and illustrates means for adding heat by the burning of charcoal. This however, is not a preferred method since, if such heat is required, I prefer to add fluid fuel directly to the gas combustion zone via means such as pipe 28. Combustion zone 36, not normally used, would be formed by introducing a mixture of air and fluid fuel to the pile via pipe 32. It will be understood that all pipes are supplied with suitable pumps and valves even though not shown.

FIGS. 5 and 6 illustrate alternative ways of piling the carbonizable material for purposes of carrying out carbonization according to the invention. The material 19 may be piled directly on flat ground 21, as shown in FIG. 5, or may be piled against a hill or cliff 38, as shown in FIG. 6. The necessary pipes (not shown) would be inserted into the interior of each such pile.

Figure 7:
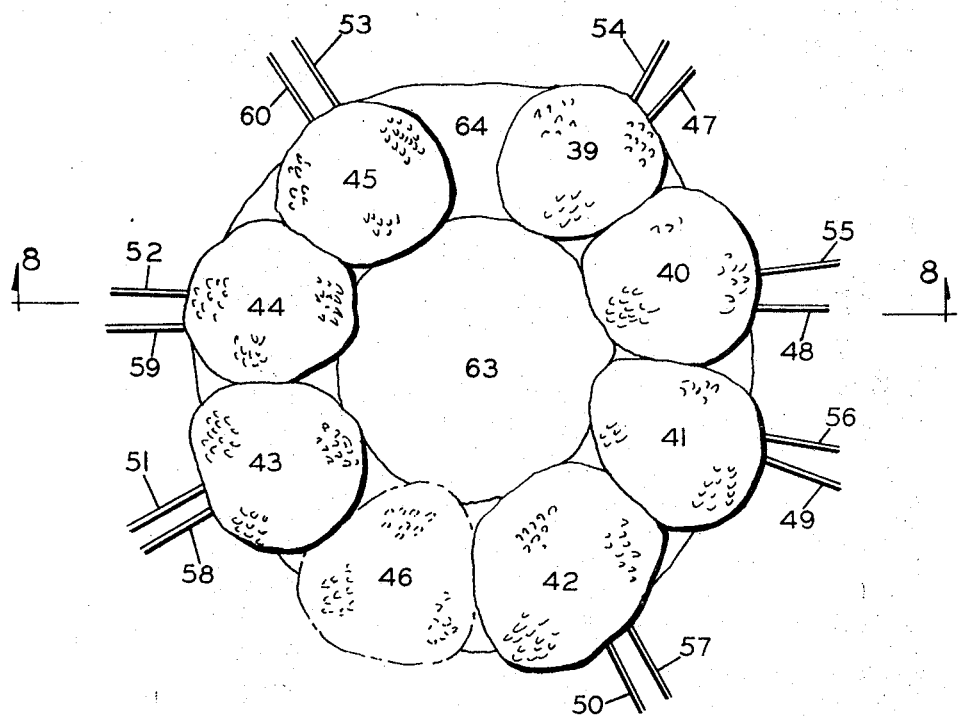
FIG. 7 is a plan view of apparatus for carrying out the method of my invention and illustrates an embodiment of my invention different from the embodiments illustrated in FIGS. 1, 2, and 4.

In the apparatus of FIGS. 7 and 8, I show seven piles of carbonizable material 39, 40, 41, 42, 43, 44, and 45, arranged in a circle. The position of a future pile 46 is shown in phantom. Each of the piles is supplied with an air (or air and water) pipe; 47, 48, 49, 50, 51, 52, and 53, respectively; and a second pipe; 54, 55, 56, 57, 58 59 and 60, respectively; which can serve to admit fuel or water as desired. The piles 39, etc. are arranged in a circle near the outside edge 61 of a hole (indicated generally by 62) in the ground. The center area 63 of the hole 62 is left clear for the movement of tractors and loading equipment (not shown). Similarly, a portion 64 of the outside edge is left unoccupied to serve as a ramp for the entrance and exit of tractors and the like. It will be understood that the carbonizable material need not be piled into sharply definable piles in the apparatus of FIGS. 7 and 8 but can be piled in a manner such that there appears to be a single pile in the shape of a large doughnut with a segment (64) missing.

In FIG. 8, and for reasons which will appear more fully hereinafter, a relatively extensive combustion zone 65 (in the form of a large shell) is shown associated with the air entering pile 40 via pipe 48 and a relatively narrow combustion zone 66 is shown associated with the air entering pile 44 via pipe 59.

Figure 9:
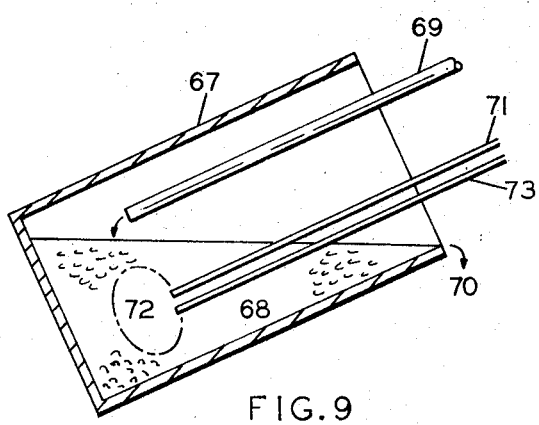
FIG. 9 is a side elevation, in cross section, of apparatus illustrating an additional embodiment of the invention.

In FIG. 9 I show an angularly disposed rotatable drum 67 holding a pile 68 of flowable particles of carbonizable material. The latter material is supplied to the drum 67 via a pipe 69 and the resulting charcoal leaves the drum by overflow over the open end of the drum (indicated by the arrow 70). An air pipe 71 supplies air (or airwater) to the interior of the pile and by combustion of volatiles (or fluid fuel) forms a combustion zone 72. Other fluids, such as fluid fuel or water, are supplied via a pipe 73.

OPERATION

Carbonizable material which is sufficiently flowable to flow downwardly by the force of gravity is selected for use in the process. Such material may be wood, bone, nut shells, corn cobs, sawdust, particles of bituminous coal, carbonizable materials impregnated with chemicals, reconstituted materials (for example, charcoal with a binder such as tar or pitch), or like particulate carbonizable material individually or in admixture. The material added may be in bagged form. In this description of the carbonization operation the carbonizable material will be presumed to be wet pecan shells.

Using the apparatus of FIG. 1 by way of example, the process is started as follows: Wet pecan shells are put into the cylinder 10 until the latter is filled up to about the level of the pipe 15. A fire is started near the top of the pile usually by igniting fluid fuel (e.g. natural gas) introduced via pipe 18. However, any type of fire will do (a wood-paper fire, for example). A quantity of air suitable for effective combustion is introduced via pipe 15. The heat supplied in this manner dries the uppermost layer of shells then initiates carbonization, and then forms a bed of incandescent particles. Shells are added and the pile is gradually built up until the cylinder 10 is completely filled. Usually the supply of fluid fuel is shut off when the carbonization process has become self sustaining. The supplying of air is however, continued in order to burn the combustible volatiles which are being evolved in the carbonization process.

When the process has been started and an active carbonization process is under way, the carbonization boundary (that is, the dividing line between those particles which have reached carbonization temperatures and those which have not) will tend to move outwardly from the points where carbonization has been initiated. In the apparatus of FIG. 1, when carbonization is first started as described above, such movement of the carbonization boundary will consist essentially of an upward advancement and a downward advancement. When, however, carbonization has been started, I begin to remove shells from the bottom of the pile (via screw conveyor 14) at a rate approximately equal to the rate of upward advancement of the carbonization boundary 17. In this manner the upper carbonization boundary 17 remains relatively stationary and the zone 16 of active carbonization and active combustion of volatiles remains relatively stationary.

When the process is first started there will be shells at the bottom of the pile which have not been carbonized. I can recycle these shells to the top of the pile until the process has reached its operational equilibrium. As will appear hereinafter, there is advantage in recycling some completely carbonized particles during the entire process.

When the process is completely under way and as the shells 11 move downwardly they are first subjected to the "washing" effects of hot gases which flow countercurrently thereto from the combustion zone 16. This washing effect preheats the shells and dries them. I have found that, because of such preheating, wet material or "green" wood can be used in the process just as effectively as dry material or aged wood.

The shells 11 flow toward, and then into, the hot zone 16. During this period the temperature of the shells is raised to their decomposition temperatures, carbonization is initiated relatively uniformly throughout the shell mass, and the temperature is further progressively and uniformly raised above the initial decomposition temperature. The unusually high temperature (as compared to prior art processes) produced by the heat of decomposition plus the heat of combustion of volatiles effects a relatively rapid evolution of additional volatile matter.

As indicated the temperature of the shells as they move toward the hot zone 16, is raised relatively uniformly. In this manner and with a controlled supply of air directly to the carbonization zone, the shells reach their decomposition temperature and subsequently exceed it in a progressive manner which provides for the controlled production of and the controlled removal of (that is, combustion of) volatile matter as it forms. This is in sharp contrast to processes which subject the evolution of volatiles to no control but which do subject them to cracking temperatures. Thus, in my process the temperature of substantially all the shells is raised directly by heat exchange with gases at gradually increasing temperatures. It will be apparent that maximum advantages of my invention will be secured by maintaining the combustion zone at a size where all, or nearly all, the shells pass through the combustion zone.

Following the initiation of carbonization the nut shells continue to carbonize as they flow toward the bottom of the reactor 10. Soon after the shells have passed the region of the air supply and most intense combustion of volatiles, the carbonization reaches a point where the rate of decomposition is not sufficient to maintain required decomposition temperatures. At this latter point there ceases to be exothermic heat of decomposition and there ceases to be volatiles to burn. Thus, and unless additional fluid fuel is burned lower in the pile, the carbonized shells begin to cool. It is desirable that the distance between the pipe 15 (or the lowermost air pipe if more than one is used) and the conveyor 14 be sufficient to allow the falling shells to carbonize and to cool sufficiently to avoid removing either partially carbonized shells or to avoid removing charcoal at a red heat.

Several very important functions are served by the submerged combustion step described.

First, and as will appear more fully hereinafter, the maintainance of the combustion zone provides a simple control on the rate of temperature increase in the shells.

Second, the combustion leads to a relatively large increase in volume of hot gases within the pile of shells to give excellent transmission of high temperature heat throughout the pile and without dissipation of such high temperature heat outside the pile. Thus assuming the volatile matter to be methyl alcohol (by way of example) combustion takes place as follows:

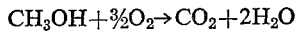

$$CH_3OH + \tfrac{3}{2}O_2 \rightarrow CO_2 + 2H_2O$$

Each volume of methyl alcohol, by burning, therefore generates a volume of carbon dioxide and two volumes of water vapor. However, for each volume of oxygen burned there remains, of the air introduced, four volumes of nitrogen or a total of six volumes of nitrogen for each volume of methyl alcohol burned. The total volume of carbon dioxide, water vapor, and nitrogen therefore amounts to nine times the volume of volatile burned. However, in the overall process each of these gases is heated from approximately room temperature (about 300° K.) to an average temperature of about 800°–1000° C. (about 1200° K. for example) which change in temperature effects a further approximately four-fold expansion. Thus, by way of example it will be seen that the burning of a volume of methyl alcohol in air at a temperature of about 900° C. results in a 36-fold volume expansion if the gases could expand freely. Thus the hot gases expand and diffuse away from the combustion zone and through the uncarbonized particles.

If we had taken the burning of acetone in air by way of example instead of methyl alcohol the foregoing calculations would have shown about a 100-fold increase in volume. The average increase in volume may be therefore about 30–100 times depending on operating conditions.

The third important function served by the combustion step is that it provides simple and almost instantaneous control of the carbonization process. Thus, if a particularly wet batch of shells is added to the hopper 12 and the shells are not coming to temperature as rapidly as desired, I merely supply natural gas or the like to the pile via pipe 18 and increase the supply of air via pipe 15. In this manner the temperature in the combustion zone is raised and the incoming shells are heated more rapidly by the hot gases from the combustion zone. Similarly, if carbonization is proceeding too rapidly and the carbonization boundary is moving toward the top of the pile, I merely inject water into the pile via pipe 15 to cool the combustion zone.

The fourth important function and, I believe, the most important one concerns the fate of the evolved volatile matter. Since the particles are heated to a much higher temperature during carbonization in my process than in other processes, I effect a relatively higher rate of evolution of volatiles in a relatively narrower carbonization zone. Such a high concentration of volatile matter at such a high temperature, if maintained for any significant period of time, would be disadvantageous to the success of my process because, as indicated above, there would be an increased tendency toward cracking, inter-reaction, and tar formation. This problem is solved, however, by burning the combustile volatiles as they form which, in effect, is equivalent to their almost instantaneous removal from the carbonization zone. Thus the combustion step of my invention provides a very interesting and valuable escalating coaction between the production of volatiles and the production of heat. Thus, in a selected zone, the higher the temperature the faster the rate of evolution of volatiles and the faster the volatiles are burned the higher the temperature will be.

In providing means for effecting the combustion of volatiles, it must be recognized that charcoal is also combustible. Therefore, if one desires to add heat to the system with no regard for what is burned, he can introduce air into a zone containing the hot charcoal product (as via pipe 32 in FIG. 4, for example), consume the oxygen in the burning of charcoal, and permit the hot combustion gases to pass through the particles undergoing carbonization. In such a process the volatiles do not burn and can be removed. As pointed out above, such a process has been described by Vartanian.

As a practical matter, there are always, in any carbonization zone, some charcoal and some combustible volatile matter and one cannot say that the air introduced into a carbonization zone will be consumed exclusively by volatiles to the complete exclusion of charcoal. All other factors being equal, however, the volatiles will contact the oxygen of the air and burn faster than will the charcoal. Since my invention deals with the timely combustion of volatiles for their removal from the reaction scene as an objective distinct from the combustion of volatiles as a source of heat, I introduce air into a zone wherein combustible volatile gases form a significant proportion of the combustible materials present (including charcoal) and I then effect the combustion of at least a substantial proportion of said combustible volatile gases in said zone.

It will be seen that operation according to the method described in connection with FIG. 1 permits of the abandonment of the cylinder 10 or of any container for the carbonizable material and permits operation following FIG. 2. This is very surprising since, at first glance, the use of an unconfined pile (19) of carbonizable material looks like a return to primitive methods, and this is true insofar as economy of apparatus is concerned. Surprisingly enough, however, and despite its simplicity, the method is not only continuous but produces a quality of charcoal heretofore unattainable in carbonization processes.

As shown in FIG. 2, the carbonizable material in flowable particulate form, wet pecan shells for example, is put into a pile. In my operations I use the pile as a storage means which saves one step of handling the material; that is, the step of transferring the shells from a storage pile to a reactor (such as hopper 12 and cylinder 10). The carbonizable material in an unconfined pile acts as its own container, a container which can be shaped and sized at will.

Downward flow of material in the pile occurs as the result of the removal of product, charcoal or coke, from the bottom thereof. As in the case of the apparatus of FIG. 1, the shells flow downwardly through a countercurrent of hot gases, then through the combustion zone 26, then through a substantially oxygen-free zone where carbonization is completed and a small proportion of volatile gases are evolved, then through a cooling zone, and then the charcoal is removed from the bottom of the pile.

Although FIG. 2 shows a hole in the ground the use of such a hole is not critical to the method since the charcoal resulting from the process can be removed at ground level (see FIG. 5) from a pile operating otherwise like the pile of FIG. 2. A hole serves the purpose of funneling the flow of carbonized material into the area of the screw conveyor 22. A pile on sloping ground or on the side of a cliff (see FIG. 6) is advantageous because it permits dumping of combustible material directly from a truck to the pile.

FIG. 3 shows the use of two screw conveyors 22, 29 spaced apart at the bottom of the pile. Actually, I have used three such spaced conveyors and more may be used, if desired. The use of a plurality of spaced conveyors at the bottom of the pile serves to prevent "hang-up" of the carbonizable material above the gas combustion zone. Pre-heating of carbonizable material as it flows downwardly toward the gas combustion zone frequently results in "sweating" of, or the evolving of, sticky materials which cause the particulate matter to stick together and form a dome-like structure or crust which "hangs-up" as the material falls away beneath it. I have found that the alternate use of screw conveyors at different positions prevents such hang-up by periodically shifting the direction of downward flow of the particles. The hang-up of particulate matter in the pile can also be avoided by recycling a part of the charcoal back to the pile.

It is important that some balance be maintained between the temperature of the gas combustion zone, the height of the combustion zone over the screw conveyor, and the rate of removal of carbonized product. It will be apparent that the rate of carbonization will increase with the temperature of the combustion zone. Similarly, the rate at which the boundary of carbonization initiation moves will depend on the temperature of the hot gases moving outwardly from the combustion zone. Generally, in operating as illustrated in FIG. 2, I remove the charcoal from the bottom of the pile at a rate sufficient to counterbalance the upward rate of advancement of the boundary of carbonization initiation. In this manner carbonization does not proceed to the outside surface of the pile, as it would if the material were not moving downward. If the downward rate of movement of the particle balances the upward rate of advancement of the carbonization boundary it is necessary then only to provide a sufficient distance of drop of the material from the combustion zone to the conveyor to permit of complete carbonization and some cooling of the particles.

Although it is generally possible to control the carbonization process at the rate and in the manner described, I have found that the carbonization rate may at times increase sufficiently (on shifting from a wet to a dry material, for example relative to the rate of removal of charcoal that the carbonization boundary reaches the outside surface of the pile and causes a fire on the outside of the pile. It is a particular advantage of the preferred embodiment of the invention that the unconfined pile can be shaped by adding more carbonizable material at the point where carbonization has reached the surface. However, I can spray water on the fire, I can inject water through the pipe 25 (FIG. 2), or I can increase the flow of recycled charcoal in order to lower the temperature of the combustion zone 26 until the process has been brought into balance again.

Similarly, one may find that the rate of fall of the material is too rapid relative to the rate of carbonization and incompletely carbonized material is being removed from the bottom of the pile. In this event I can slow the rate of charcoal removal and thus its rate of downward flow, or I can recycle part of the incompletely carbonized material, or I can introduce a fluid fuel (natural gas, for example) into the pile via pipe 25 and increase correspondingly the input of air via pipe 25. In the latter case the temperature of the combustion zone is increased and the carbonization rate is correspondingly increased.

I have stressed the foregoing ways of adjusting the operation of the carbonization method mostly to make my teachings as complete as possible. Actually, when once the method is in operation it requires an almost deliberate attempt on the part of the operator to "foul-up" the operation. For example, and although I have pointed out that fluid fuel can be introduced into the pile from outside the pile this expedient is rarely used except when first starting the pile. Actually, the method of my invention leads to the conservation of the considerable quantities of heat in and around the carbonization zone particularly because of the presence of relatively vast quantities of insulating material (charcoal) surrounding the carbonization zone. By way of example ordinary activation processes require the use of additional fuel and require water to be present in the form of steam. In my process, however, I have added liquid water to the carbonization zone during the activation of charcoal and, despite the removal of latent heat thereby, the process operated successfully without the addition of auxiliary fluid fuel. Similarly and by way of further example, I have shut down my operation for half a day or more and then started operation again by merely turning on the air, there being plenty of reserve heat.

In those instances where one is moving carbonizable material upwardly in a pile by means of a bottom feed stoker, for example, one may wish to direct the flow of gases downwardly from the combustion zone. In such case the pile operates in reverse of the manner illustrated in FIG. 2. Here again, however, balance can be maintained in the pile by controlling the rate of upward movement of material to approximately the downward rate of propagation of the boundary of carbonization initiation.

As an alternative to the described methods I can extend the combustion zone vertically in the manner illustrated, in a general way, by FIG. 4. As shown in FIG. 4, I introduce air via pipe 25 in the manner already described except that the quantity of air is more restricted as compared to operation in accordance with FIG. 2. However, I also introduce restricted quantities of air via pipes 31 and 34, to burn portions of the volatile matter, thus creating combustion zones 26, 35, 37. By this means some of the volatiles are burned relatively lower and some relatively higher in the pile. I can introduce, also, water or steam near the bottom of the carbonization zone via the pipe 33. As indicated previously air can be introduced near the bottom of the pile by pipe 32, for example, but this is not a preferred means of obtaining heat. It does, however, approach and illustrate prior art methods of increasing temperature by bringing air into contact with hot charcoal. It will be understood that the use of the term "air" in this description and in the appended claims includes the use of pure oxygen or the use of oxygen-enriched air, if such gases should be preferred. I have, for example, used oxygen-enriched air to effect carbonization, even in confined piles, at temperatures which could not possibly have been withstood by the materials of construction in the prior art carbonization methods. My operations at these high temperatures were successful because the zone of submerged combustion was relatively remote from the container wall.

Thus, air (or oxygen) can be introduced into a number of zones, vertically or horizontally, inside the pile, the quantity of air entering the pile through each pipe being selectively limited to burn a selected proportion of volatiles (or fluid fuel) in each zone. This simple method of temperature control can be further refined by introducing water or steam into the pile at one or several levels in order to provide for the attainment of any desired temperature gradient.

I have found also that some advantage can be secured by a multi-step process wherein partial carbonization is carried out in one pile and further carbonization is carried out in a second pile, a third pile, etc. Such operation would be advantageous to a manufacturer who supplies a number of different charcoal markets. Thus, one might prepare in one pile a partially carbonized product containing about 10–15% volatiles and then divert a portion of the product to a second pile for further carbonization for the activated carbon market. Other combinations of steps will suggest themselves to those skilled in the art. I have found also that many of the objectives of the invention can be attained by recirculating partially carbonized material through the pile. In particular, it is my practice to circulate a substantial proportion of the charcoal when I first start a pile operating.

Submerged combustion carbonization, in accordance with the methods illustrated (as in FIG. 2, for example), operates continuously with a continuous or intermittent feed of carbonizable particles to the top of the pile and with a substantially continuous removal of charcoal from the bottom of the pile. Little, if any, smoke can be observed during operation. Thus, the only combustible material which leaves the pile, or the container, is charcoal itself.

Essentially all the heat of decomposition plus the heat of combustion of volatiles leaves the pile associated with the charcoal, with evolved moisture, or with the gases from the combustion zone. Considerably more heat results from my methods than other methods in view of the combustion of volatiles within the pile, particularly when an oxygen-enriched air is used and particularly when the burning of auxiliary fuel is involved in the method. However, this heat is so effectively distributed within the pile, I can usually place my hand against any part of the surface of the pile with comfort.

The carbonization methods carried out as illustrated by FIGS. 1, 2, and 4 involve the balancing of the downward movement of carbonizable particles countercurrently to an upward movement of the carbonization boundary or the carbonization zone. As discussed above these directions can be easily reversed to provide relative but opposite moment of particles and carbonization zone. Thus, the particles can be moved upwardly to balance a carbonization boundary moving downwardly. FIG. 9 illustrates another such relative movement—a lateral movement.

As illustrated in FIG. 9, the carbonizable particles enter a slowly rotating drum 67 via a pipe 69. As the drum rotates (slowly to avoid undue mixing) the particles tend to move to the right (as shown) and eventually flow, as a charcoal or coke product, over the right edge 70 of the drum. In this manner the particles are tumbled and moved laterally through a combustion zone 72 wherein the volatiles are brought into contact with air entering the apparatus via pipe 71. Thus, I effect a lateral movement of the particles through the carbonization zone countercurrently to a direction of advancement of the carbonization boundary and at a rate approximately equal to said advancement. In this manner the carbonization zone remains substantially stationary.

The foregoing methods illustrate movement of the particles through a relatively stationary carbonization zone. The apparatus of FIGS. 7 and 8 illustrate means for effecting relative movement between particles and combustion zone wherein the zone is permitted to move through substantially stationary particles. In this latter method, as illustrated, I initiate carbonization in a pile such as pile 40 in the manner already described. In this instance however, I do not remove any material from the pile but rather permit the carbonization zone to move outwardly from the point of initiation in much the same manner (with one important exception) that the carbonization boundary advances in the above mentioned primitive processes. The importat exception is that I introduce air into the interior of the pile such as by pipe 48.

When carbonization has been first initiated in pile 40 and air is being fed into the carbonization zone the pile is operating much like the pile of FIG. 2. However, since there is no movement of the particles carbonization becomes complete in the initial zone and this zone becomes devoid of combustible volatile matter. Meanwhile, however, the carbonization boundary has been moving outwardly in the form of an expanding spherical surface, or shell, while air from pipe 48 diffuses outwardly to contact evolved gases. In this manner the combustible volatiles are burned in the carbonization zone substantially as rapidly as they are evolved and the combustion zone 65 of pile 40 moves progressively outward until the pile has been completely carbonized. It is important that a pile, such as pile 40, be limited in size so that the volume of hot charcoal inside the combustion zone 48 does not become large enough to consume the air entering via pipe 48. Otherwise, it becomes difficult to effect the combustion of volatiles.

At a selected interval after carbonization has been started in the first pile (for example, one day) carbonization is started in a second pile 41. Following another interval of time, a third pile 42 may be started; etc. When the first pile 40 has been completely carbonized; for example, in one week; the charcoal can be removed and a new pile started in its place. Such a method gives many of the advantages of continuous operation and is especially advantageous if the various piles are arranged in a circle (FIG. 8) leaving a space for a future pile 46, and a space 64 through which to move charcoal handling equipment. In this manner I provide for carbonization in a plurality of piles of carbonizable particles such that carbonization in each pile, at any selected time, has proceeded to a different degree of completion. Thus in FIGS. 8 and 9, I show a phantom pile 46 where carbonization has not started; I show a pile 44 where carbonization has just gotten under way and the combustion zone 66 is close to the pipe 59; and I show a pile 40 where carbonization is almost complete and the combustion zone 65 is relatively far from the pipe 48.

Where the method of the invention is used to activate particles which have been previously substantially carbonized or is used to reactivate spent but previously activated charcoal or bone char the method is similar to that already described except that all, or a substantial proportion of, the heat in the hot zone is supplied by means of introducing both air (or oxygen) and fluid fuel, from outside the pile, into the combustion zone. Thus, using FIG. 2 by way of example, charcoal would be added to the top of the pile (19), air would be introduced via pipe 25, and a fluid fuel (e.g. natural gas) would be introduced via pipe 28 to burn in combustion zone 26. Otherwise the pile would be operated in the manner already described.

From the foregoing description it may be seen that drying, carbonization, and activation can be carried out in a single furnace, or single pile without requiring the use of expensive materials for furnace construction, without requiring the use of fuel gas, and without requiring the use of steam.

Similarly, when a chemically impregnated material is added to the pile (such as pile 19 of FIG. 2), there is a relatively smaller proportion of volatiles evolved as compared to non-impregnated materials. The use of such materials usually requires the introduction of some fluid fuel into the carbonization zone. Although corrosive vapors are generated in the carbonization zone in this latter case the outer, and relatively colder portions of the pile acts as a scrubber and prevent the vapors from entering the atmosphere. The absence of a container during the use of corrosive chemicals leads to very significant savings in operating costs.

It is noteworthy that I have conducted submerged combustion carbonization in accordance with the methods described without the use of temperature gauges or other sensor devices and yet have maintained substantially perfect control of the process. The method appears to be substantially insensitive to process variables. This is particularly noteworthy since the method can be carried out under conditions which would render other processes completely useless. For example, I maintain this simple control even though wet or green material is being fed into the pile and even though a wide variety of shapes and sizes of material, including a variety of waste materials, is being fed into the pile.

It is to be understood that the above described embodiments of my invention are for purposes of illustration only and various changes may be made therein without departing from the spirit and scope of the invention.

I claim:

1. In the method of carbonizing particles of a carbonizable material wherein carbonization is effected in a zone within a pile of said particles and wherein said zone includes, among the combustible elements therein, a substantial proportion of combustible gases evolved from said material as a result of said carbonization; the improvement which comprises effecting, within said zone, the combustion of substantially all of said combustible gases as said gases are being evolved.

2. The method according to claim 1 wherein said method yields an activated carbon.

3. The method according to claim 1 wherein fluid fuel is introduced into said zone from outside the pile.

4. The method according to claim 1 wherein relative movements is effected between said particles and said zone.

5. The method according to claim 1 wherein the temperature in said zone is corrected upwardly, when necessary, by introducing fluid fuel and air into said zone and is corrected downwardly, when necessary, by introducing water into said zone.

6. In the method of carbonizing particles of a carbonizable material wherein carbonization is effected in a zone within a pile of said particles; wherein said zone includes, among the combustible elements therein, a substantial proportion of combustible gases evolved from said material as a result of said carbonization; and wherein the carbonization boundary between the particles within said zone and the particles not undergoing carbonization tends to advance outwardly from said zone; the improvement which comprises the step of introducing air into said zone to effect, within said zone, the combustion of substantially all of said combustible gases as said gases are being evolved and the step of maintaining said zone in a relatively stationary position by effecting a movement of said particles through said zone countercurrently to a direction of advancement of said carbonization boundary and at a rate approximately equal to the rate of said advancement.

7. The method according to claim 6 wherein a portion of the particles carbonized by said method is recycled for further carbonization.

8. The method according to claim 6 wherein the movement of said particles is downward.

References Cited

UNITED STATES PATENTS

| 1,510,730 | 10/1924 | Wilcox | 201—29 |
| 2,757,129 | 7/1956 | Reeves et al. | 201—34 XR |
| 2,898,272 | 8/1959 | Odell | 201—34 XR |

FOREIGN PATENTS

| 590,882 | 1925 | France. |

WILBUR L. BASCOMB, Jr., Primary Examiner

D. EDWARDS, Assistant Examiner

U.S. Cl. X.R.

201—37, 40; 202—210; 252—421